United States Patent [19]

Lippert

[11] 4,410,485

[45] Oct. 18, 1983

[54] ASSEMBLY FIXTURE FOR CROSS-SHAPED CONTROL RODS OF BOILING WATER NUCLEAR REACTORS

[75] Inventor: Hans-Joachim Lippert, Erlangen, Fed. Rep. of Germany

[73] Assignee: Kraftwerk Union Aktiengesellschaft, Mülheim an der Ruhr, Fed. Rep. of Germany

[21] Appl. No.: 128,275

[22] Filed: Mar. 7, 1980

[30] Foreign Application Priority Data

Mar. 13, 1979 [DE] Fed. Rep. of Germany ....... 2909793

[51] Int. Cl.³ ............................................. G21C 19/00
[52] U.S. Cl. .................................. 376/260; 376/262; 269/315; 29/271
[58] Field of Search ............................. 376/260–264, 376/268; 29/271; 269/315, 319, 904; 248/544

[56] References Cited

U.S. PATENT DOCUMENTS 3,856,621  11/1974  Suvanto et al. .................... 376/262

FOREIGN PATENT DOCUMENTS 53-27792  3/1978  Japan ................................ 376/262
392789  4/1977  U.S.S.R. .......................... 376/260

Primary Examiner—Harvey E. Behrend
Attorney, Agent, or Firm—Herbert L. Lerner; Laurence A. Greenberg

[57] ABSTRACT

An assembly fixture for cross-shaped control rods of boiling-water nuclear reactors with an upper core grid mesh for holding a core cell formed of four fuel assemblies having a gap therebetween and means disposed beneath the reactor core for driving the control rods in the gap, including a frame having corners formed therein, the frame being substantially the size of a core cell and being disposable on the core grid, templates diagonally oppositely disposed on the frame and extending into the core cell for lateral guidance of the control rods, stops for the control rods disposed on the templates, and a carrying handle having a first portion thereof being pivotable at one of the corners of the frame and a second portion thereof being locked to an opposite corner of the frame in a disassembled condition and swung out of the locked condition in an assembled condition.

2 Claims, 3 Drawing Figures

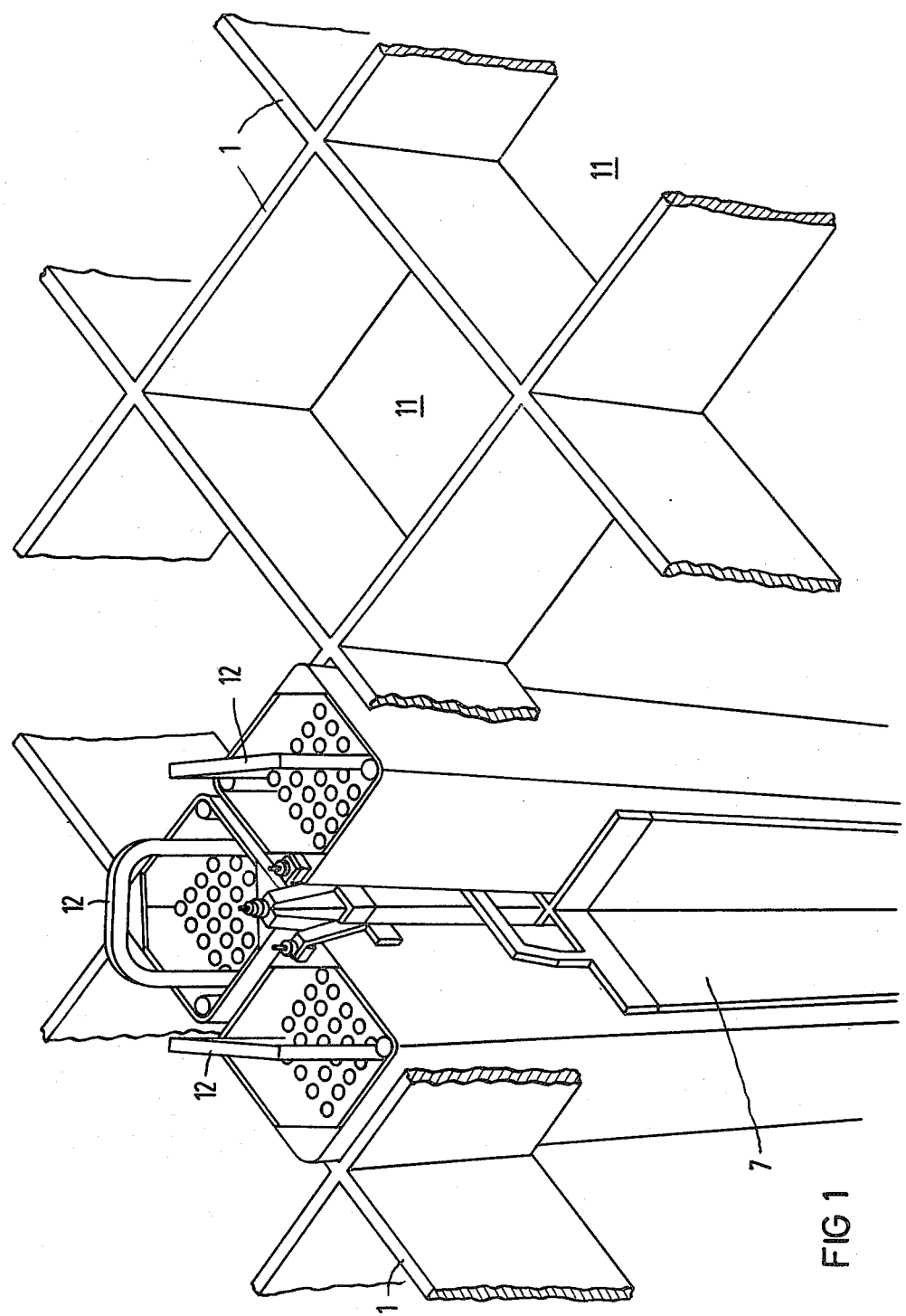

ASSEMBLY FIXTURE FOR CROSS-SHAPED CONTROL RODS OF BOILING WATER NUCLEAR REACTORS

The present invention relates to an assembly fixture for cross-shaped control rods of boiling-water nuclear reactors which can be moved in the gap between four adjacent fuel assemblies that form a so-called core cell and are held by a respective mesh of the upper core grid. The control rods are moved by a rod drive disposed underneath the reactor core, and can be coupled to the latter. It is generally known that fuel assemblies enclosed on all sides are used for boiling-water nuclear reactors, and that four of them are always combined in a core cell. These four fuel assemblies of a cell are engaged by the upper core grid; a cross-shaped control rod is inserted into the cross-shaped gap remaining between them.

This control rod is inserted from above; it is driven in the vertical direction from below the reactor core.

The coupling between the control rod drive and the control rod itself is generally accomplished by means of a bayonet lock and, therefore, always requires a rotary motion of the control rod to be inserted.

This requires that the control rod be inserted before the fuel assembly in the core cell in question. It is furthermore necessary to hold the control rod in the coupled position until two diagonally opposite fuel assemblies are inserted.

This has heretofore been accomplished with an assembly tool which had two parts and had to be placed on respective diagonally opposite corners of the core grid. Through its special construction it had to be insured that this assembly fixture always remained in its exact reference position. It was provided with templates in a horizontal arrangement which had to see to it that the wings of the control rod to be inserted were guided when the latter was rotated for the coupling operation. When the desired position of the control rod was reached, two fuel assemblies could then be inserted into the core cell which then already provided a mounting for the control rod, so that the two auxiliary tools could be removed. It then presented no further difficulties for the assembly of the reactor core to insert the remaining two fuel assemblies.

This procedure for inserting the control rod in the fuel assembly was very laborious since two separate auxiliary tools had to be inserted and operated. In this connection it should also be noted that only remote control is normally usable for this purpose. The remote control device must be steered through a reactor cavity full of water.

It is accordingly an object of the invention to provide an assembly fixture for cross-shaped control rods of boiling-water nuclear reactors, which overcomes the hereinafore-mentioned shortcomings of the heretofore-known devices of this general type and to replace this laborious procedure by a simpler one, in which the number of individual operations for its use is substantially reduced. This would then also result in a distinct reduction of possible troubles, which would manifest itself not only time-wise but also from a safety point of view.

With the foregoing and other objects in view there is provided, in accordance with the invention an assembly fixture for cross-shaped control rods of boiling-water nuclear reactors with an upper core grid mesh for holding a core cell formed of four fuel assemblies having a gap therebetween and means disposed beneath the reactor core for driving the control rods in the gap, comprising a frame having corners formed therein, the frame being substantially the size of a core cell and being disposable on the core grid, templates diagonally oppositely disposed on the frame and extending into the core cell for lateral guidance of the control rods, stops for the control rods disposed on the templates, and a carrying handle having a first portion thereof being pivotable at one of the corners of the frame and a second portion thereof being locked to an opposite corner of the frame in a disassembled condition and swung out of the locked condition in an assembled condition.

In accordance with a concomitant feature of the invention, there is provided an axially movable pin or bolt disposed outside the opposite corner of the frame for locking the second portion of the carrying handle thereto, and means for releasing the carrying handle from the pin or bolt when the frame is placed on the core grid.

Other features which are considered as characteristic for the invention are set forth in the appended claims.

Although the invention is illustrated and described herein as embodied in an assembly fixture for cross-shaped control rods of boiling-water nuclear reactors, it is nevertheless not intended to be limited to the details shown, since various modifications and structural changes may be made therein without departing from the spirit and the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a fragmentary perspective view of an upper core grid and fuel assemblies of a nuclear reactor, according to the invention;

Figure 3:
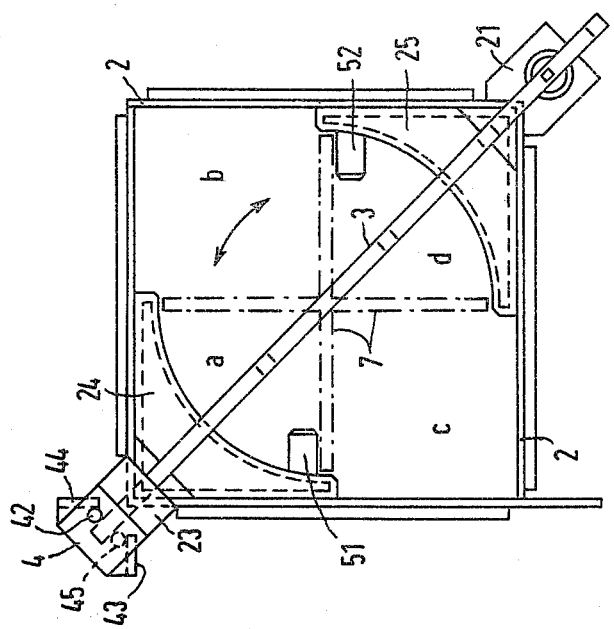
FIG. 3 is a top plan view of FIG. 2.

Referring now to the figures of the drawing and first particularly to FIG. 1 thereof, there is seen an upper core grid 1, which is constructed from webs that are placed on edge and cross each other at right angles. The meshes 11 formed thereby always surround a core cell which includes four fuel assemblies 12. During the operation of the reactor, a cross-shaped control rod 7 moves in the space between the fuel assemblies; the non-illustrated control rod drive is located underneath the reactor core; the connection to the drive is generally accomplished by means of a bayonet coupler. The control rod 7 is inserted from above by means of a suitable remote control tool; it is, of course, necessary for no fuel assemblies to be as yet located in the core cell in question. These can be inserted only when the control rod is in place. Conversely, the fuel assemblies must be removed before the control rod can be gripped, turned and withdrawn upward by the remote control tool.

Figure 2:
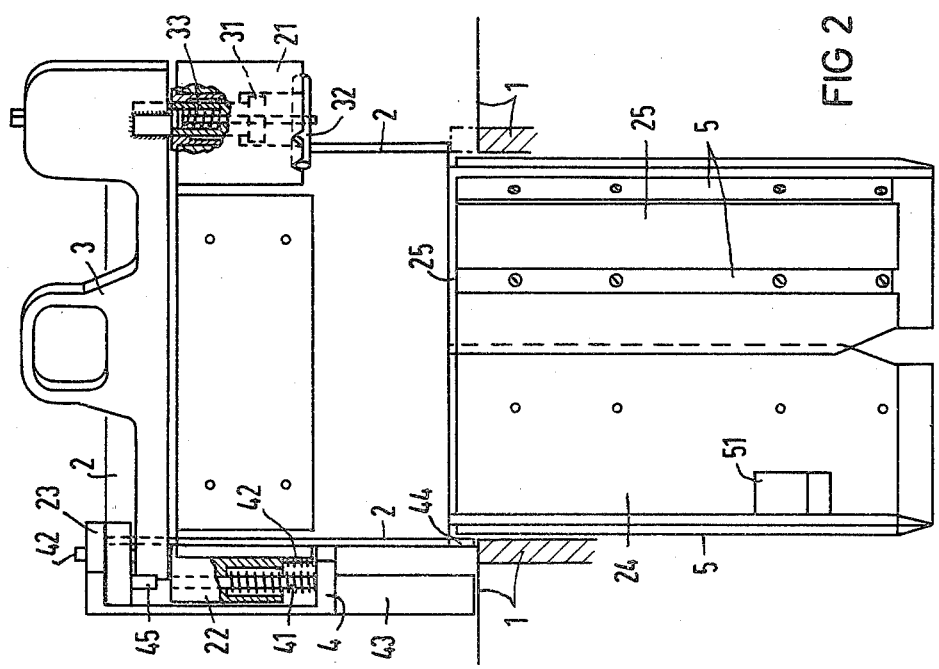
FIG. 2 is a side-elevational view of the assembly fixture according to the invention, partly broken away.

The assembly fixture according to the invention shown in FIGS. 2 and 3 includes, first, a frame 2, which corresponds to the size of a core cell 11 and is put on the latter. As shown in FIG. 3, this frame 2 is provided with two diagonally-opposite templates 24 and 25, that serve to guide the control rod 7, which is indicated in FIG. 3 by dot-dash lines. To ensure proper seating of the frame 2 on the upper core grid 1, these templates 24, 25 extend downward into the core cell space, and are additionally provided with sliding bars 5 on their right-angularly disposed outside surfaces. This is necessary for the secure guidance of the assembly tool for insertion into the upper core grid 1. In addition, however, stops 51, 52 are attached to the templates 24 and 25 which may be hollow or solid. The control rod 7 to be inserted must be turned up to the stops 51, 52 so that the coupling operation at its other end can be executed completely and so that the necessary position of the control rod for insertion of the fuel assemblies is reached.

The assembly fixture is provided with a carrying handle 3 which entends diagonally across the equipment, so that it can now be inserted into the upper core grid of the boiling-water reactor under remote control. For inserting the control rod 7, however, it must be possible to swing it to one side. For this purpose, it is pivoted at one corner of the frame 2 by means of a pin 31 in a joint element 21. For transmitting the carrying force, this pin 31 is provided in the manner shown with a lower shoulder. The carrying handle 3 then engages at the opposite corner under the transverse plate 23 fastened to the frame 2, and rests laterally against a vertical pin 42. On the other side a likewise vertically movable pin 45 initially prevents a lateral movement of the carrying handle 3. The two pins 42 are fastened to a bracket 4, which is axially movably supported in a guide piece 22 by means of a spring-loaded pin 41. The guide piece 22 is rigidly connected to the frame 2. The bracket 4 is further provided with narrow legs 43 and 44 which extend downward and are braced against the adjacent webs of the upper core frame 1 when the assembly fixture is inserted. If the assembly fixture is now inserted under remote control, suspended from the remote control machine, into the desired core cell 11, the legs or straps 43 and 44 are first supported on the webs of the core frame 1 and push the bracket part 4 upward, while the frame 2 is deposited directly on the core structure. This procedure is shown by the position of the upper core grid 1 relative to the assembly fixture indicated in FIG. 2. Through this forced motion, the pin 45 fastened to the bracket 4 is disengaged, and the carrying handle 3 can be swung to one side. A detent device 32 at the pivot joint 21 secures the end position to be reached.

After the assembly fixture has been placed in this manner on the core cell or the mesh of the upper core grid 11 and the handle has been swung to one side, the remote-controlled tool disengages and now inserts the control rod 7. After the latter has reached its lowest position it is turned, in accordance with the construction of the bayonet lock, until it has reached the position shown in FIG. 3 by striking the stops 51 and 52. Then, a fuel assembly can be inserted into the respective segments b and c shown in FIG. 3, whereby the mutual position of the control rods and also of the fuel assemblies is already fixed. Subsequently, the carrying handle 3 is swung-in again and the tool is lifted upward; the springs on the pin 41 and 42 bringing the bracket 4 and therewith the locking pin 45 downward into the locking position so that the carrying handle 3 is secured.

After the assembly fixture is removed, the segments a and d of the core cell can be equipped with the remaining fuel assemblies 12. A special auxiliary tool is no longer required for this purpose.

This compact assembly fixture, which only includes one piece, facilitates the handling considerably, which is further aided by the uniform distribution of the masses. It is evident that the assembly times are substantially shortened by the reduction of the number of operating steps connected therewith, not counting the very substantial reduction of possible disturbances.

The solution shown diagrammatically in the drawings, can of course be modified in various ways; this would depend on the remote control tools available and also on other physical conditions that might be different.

I claim:

1. In a system for assembling the fuel assemblies and cross-shaped control rods of a boiling water reactor wherein said reactor has an upper core grid mesh for holding a core cell formed of four fuel assemblies having a gap therebetween and means disposed beneath the reactor core for driving the control rods in the gap, an assembly fixture comprising a frame having corners formed therein, said frame being substantially the size of a core cell and being disposable on the core grid, templates diagonally oppositely disposed on said frame and extending into the core cell for lateral guidance of the control rods, stops for the control rods disposed on said templates, and a carrying handle having a first portion thereof being pivotable at one of said corners of said frame and a second portion thereof being locked to an opposite corner of said frame in a disassembled condition and swung out of said locked condition in an assembled condition.

2. A system according to claim 1, including an axially movable pin disposed outside said opposite corner of said frame for locking said second portion of said carrying handle thereto, and means for releasing said carrying handle from said pin when said frame is placed on said core grid.

* * * * *